US012187046B2

(12) United States Patent
Nakano

(10) Patent No.: US 12,187,046 B2
(45) Date of Patent: Jan. 7, 2025

(54) MEMORY, CARTRIDGE, AND PRINTING SYSTEM

(71) Applicant: SEIKO EPSON CORPORATION, Tokyo (JP)

(72) Inventor: Shuichi Nakano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 129 days.

(21) Appl. No.: 17/884,173

(22) Filed: Aug. 9, 2022

(65) Prior Publication Data

US 2023/0053200 A1 Feb. 16, 2023

(30) Foreign Application Priority Data

Aug. 10, 2021 (JP) ................................ 2021-130678

(51) Int. Cl.
*B41J 2/175* (2006.01)
*B41J 3/46* (2006.01)

(52) U.S. Cl.
CPC ....... *B41J 2/17546* (2013.01); *B41J 2/17506* (2013.01); *B41J 3/46* (2013.01)

(58) Field of Classification Search
CPC ...... B41J 2/17506; B41J 2/17546; B41J 3/46; B41J 2/175; B41J 2/17513; B41J 2/1753; B41J 2/17553
See application file for complete search history.

(56) References Cited

U.S. PATENT DOCUMENTS 6,325,495 B1 * 12/2001 Foth ..................... B41J 2/17546 347/85
10,956,556 B2 3/2021 Jeran et al.
2011/0131441 A1 * 6/2011 Asauchi ............... B41J 2/17553 713/501
2013/0208051 A1 * 8/2013 Koizumi .................. B41J 2/175 347/50

FOREIGN PATENT DOCUMENTS

JP 2016-525852 A 8/2016

* cited by examiner

*Primary Examiner* — Jannelle M Lebron
(74) *Attorney, Agent, or Firm* — Oliff PLC

(57) ABSTRACT

A memory stores manufacturing information including at least the number of refills, an electronic signature of the manufacturing information, and a first error-detecting code of the manufacturing information. The number of refills is the number of times that, after consumption of a liquid contained in the cartridge, the cartridge is refilled with the liquid.

7 Claims, 12 Drawing Sheets

FIG. 10

138

| ADDRESS | DATA CONTENT |
|---|---|
| A0 | NUMBER OF REFILLS |
| A1 | DATE OF MANUFACTURE |
| A2 | SERIAL NUMBER |
| A3 | LIQUID TYPE |
| A4 | ELECTRONIC SIGNATURE |
| A5 | FIRST ERROR-DETECTING CODE |
| A6 | CONSUMPTION DATA |
| ⋮ | ⋮ |
| An | ⋯ |

MANUFACTURING INFORMATION (A0–A3)

STORAGE AREA (A0–An)

MEMORY, CARTRIDGE, AND PRINTING SYSTEM

The present application is based on, and claims priority from JP Application Serial Number 2021-130678, filed Aug. 10, 2021, the disclosure of which is hereby incorporated by reference herein in its entirety.

BACKGROUND

1. Technical Field

The present disclosure relates to techniques of a memory that is attached to a cartridge.

2. Related Art

Techniques of storing a digital signature for a memory attached to a cartridge are known (JP-A-2016-525852). The digital signature signs data stored in a cartridge that contains an identifier that is unique to the cartridge.

In the known techniques, for example, using hashes, a printer performs verification of digital signature, that is, determines whether the cartridge is a genuine product manufactured by an intended manufacturer and, if not, the printer will deny the authentication. With the known techniques, when data stored in the memory is corrupted, the cartridge might be determined as being not a genuine product as a verification result of the digital signature even though the cartridge is a genuine product.

SUMMARY (1) According to a first form of the present disclosure, a memory that is attached to a cartridge is provided. This memory stores manufacturing information including at least a number of refills, an electronic signature of the manufacturing information, and a first error-detecting code of the manufacturing information. The number of refills is a number of times that after consumption of a liquid contained in the cartridge, the cartridge is refilled with the liquid.

(2) According to a second form of the present disclosure, a cartridge is provided. This cartridge includes a liquid container for containing a liquid, a liquid supplier configured to supply the liquid of the liquid container, and a memory. The memory stores manufacturing information including at least a number of refills, an electronic signature of the manufacturing information, and a first error-detecting code of the manufacturing information. The number of refills is a number of times that after consumption of the liquid contained in the cartridge, the cartridge is refilled with the liquid.

(3) According to a third form of the present disclosure, a printing system is provided. This printing system includes the cartridge according to the form described above, and a control device. The control device includes a calculator configured to calculate a second error-detecting code from the manufacturing information of the memory, and a comparison determiner configured to compare the first error-detecting code of the memory with the calculated second error-detecting code. The comparison determiner is configured to, when the first error-detecting code matches the second error-detecting code, verify the electronic signature of the memory.

BRIEF DESCRIPTION OF THE DRAWINGS

FIG. 10 is a diagram illustrating a storage.

DESCRIPTION OF EXEMPLARY EMBODIMENTS

A. Embodiment

Figure 1:
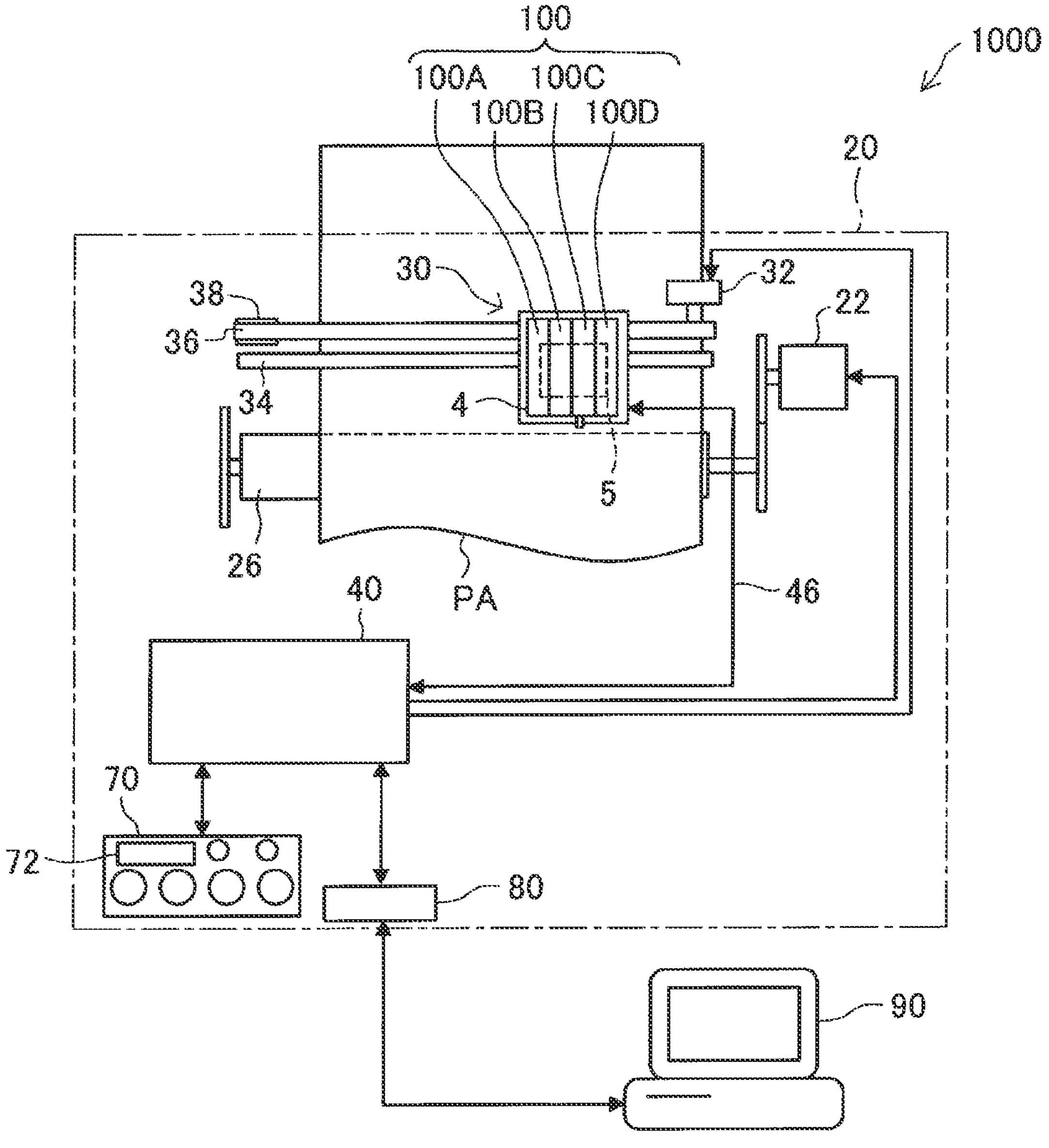
FIG. 1 is a diagram illustrating a schematic configuration of a printing system as an embodiment of the present disclosure.

FIG. 1 is a diagram illustrating a schematic configuration of a printing system 1000 as an embodiment of the present disclosure. The printing system 1000 includes a printing device 20, a plurality of cartridges 100 that are removably mounted on the printing device 20, and a computer 90. The printing device 20 is an ink jet printer that performs printing by ejecting ink as a liquid onto a printing medium PA. The printing device 20 is coupled, via a connector 80, to a computer 90 to enable communication of data with the computer 90.

The printing device 20 includes a sub-scanning feed mechanism and a main-scanning feed mechanism, a head drive mechanism, and a device controller 40. The sub-scanning feed mechanism, which includes a paper feed motor 22 and a platen 26, transports the printing medium PA in a sub-scanning direction by transmitting the rotation of the paper feed motor 22 to the platen 26. The main-scanning feed mechanism includes a carriage motor 32, a pulley 38, a drive belt 36 extending between the carriage motor 32 and the pulley 38, and a sliding shaft 34 provided parallel with the axis of the platen 26. The sliding shaft 34 slidably holds a carriage 30 fixed to the drive belt 36. The rotation of the carriage motor 32 is transmitted through the drive belt 36 to the carriage 30, so that the carriage 30 reciprocates along the sliding shaft 34 in the main scanning direction, which is the axis direction of the platen 26. The head drive mechanism includes the carriage 30. The carriage 30 includes a mount portion 4 on which the cartridges 100 can be mounted, a print head 5 that ejects ink, a liquid introducer 6 illustrated in FIG. 6 described below, a coupling mechanism 400 illustrated in FIG. 6 described below, and a sub-control board 500 illustrated in FIG. 6 described below. The head drive mechanism drives the print head 5 of the carriage 30 to eject ink onto the printing medium PA.

The device controller 40 implements a printing process by controlling the mechanisms mentioned above. The device controller 40 is electrically coupled via a bus 46 to the sub-control board 500 described below of the carriage 30. The device controller 40, for example, receives a print job of the user via the computer 90 and controls the mechanisms mentioned above based on the content of the received print job so that the mechanisms perform printing operations. The device controller 40 also performs a mounting determination as to whether the cartridge 100 has been mounted on the mount portion 4 and performs data communication with the circuit board 120.

On the mount portion 4 of the carriage 30, a plurality of cartridges 100 can be removably mounted. That is, the cartridges 100 for supplying inks as liquids to the print head 5 are included in the mount portion 4 of the carriage 30 such that the cartridges 100 can be attached and removed by a user operation. In the present embodiment, the number of cartridges 100 that are able to be mounted on the mount portion 4 is four. Inks of different colors or types are contained in four cartridges 100. Reference numerals 100A, 100B, 100C, and 100D are used to refer to the plurality of cartridges 100 when they are discriminated from each other. The four cartridges 100A to 100D are mounted on their respective predetermined mounting positions of the mount portion 4. In other embodiments, the number of cartridges 100 that are able to be mounted on the mount portion 4 is not limited to four and may be less than or greater than four. The printing device 20 further includes an operation unit 70 with which the user performs various settings for the printing device 20 and confirms the status of the printing device 20. The operation unit 70 includes a display unit 72 for displaying various types of information such as the status of the printing device 20.

In the present embodiment, the printing system 1000 is of a type called on-carriage in which the cartridges 100 are mounted on the mount portion 4 of the carriage 30; however, the printing system 1000 is not limited to this. For example, the printing system 1000 may be of a type called off-carriage in which the cartridges 100 are mounted on a mount portion at a different location from the carriage 30.

Figure 2:
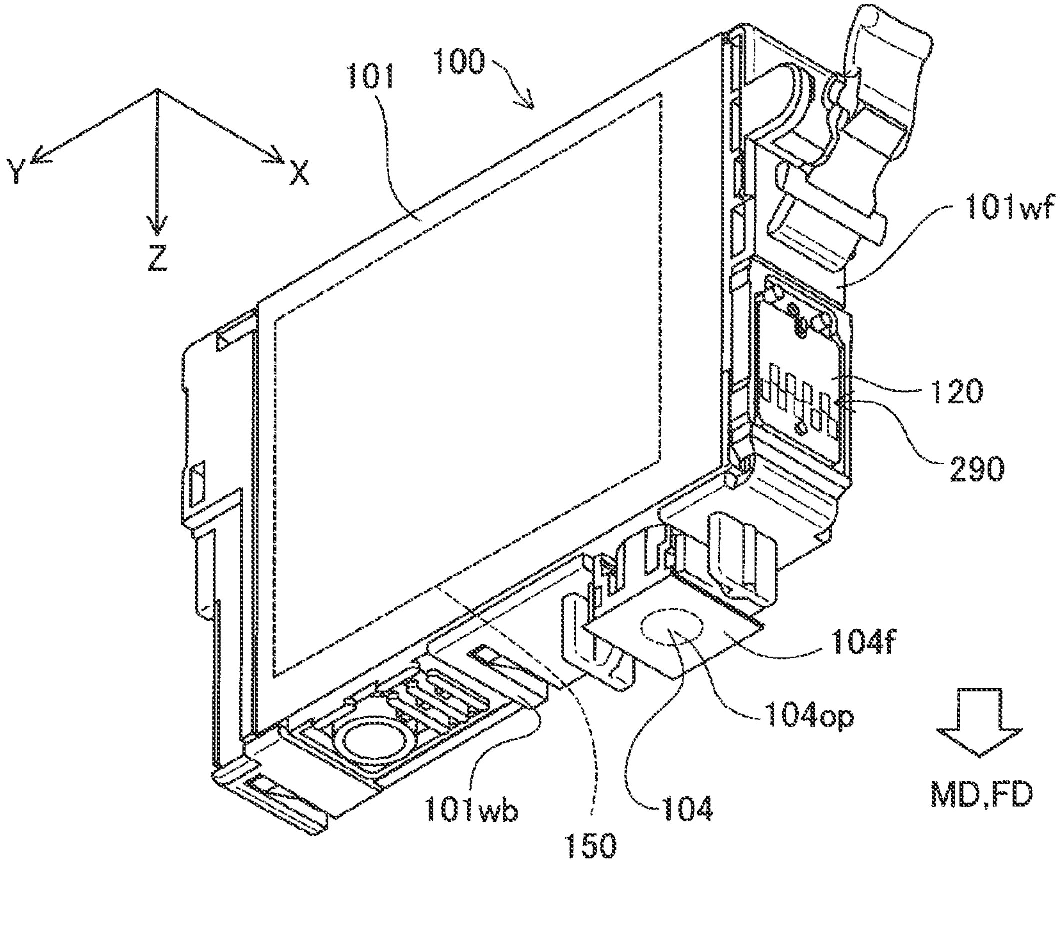
FIG. 2 is a first perspective view illustrating a configuration of a cartridge.
Figure 3:
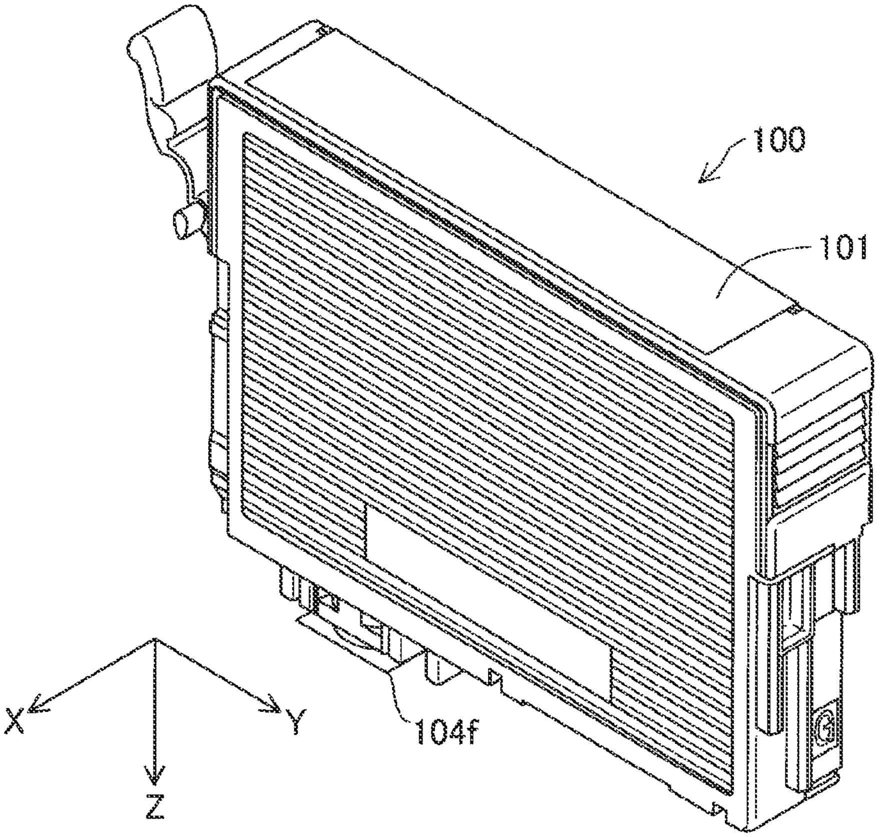
FIG. 3 is a second perspective view illustrating a configuration of the cartridge.

With reference to FIG. 2 and FIG. 3, the configuration of the cartridge 100 will be described. FIG. 2 is a first perspective view illustrating the configuration of the cartridge 100. FIG. 3 is a second perspective view illustrating the configuration of the cartridge 100. In FIG. 2 and the subsequent figures, the X-axis, Y-axis, and Z-axis perpendicular to each other are added as desired. In FIG. 2, the directions in which the arrows of the X-axis, Y-axis, and Z-axis are pointing indicate the positive directions of the X-axis, Y-axis, and Z-axis, respectively. The positive directions of the X-axis, Y-axis, and Z-axis are assumed as the +X direction, +Y direction, and +Z direction, respectively. The directions opposite to the directions in which the arrows of the X-axis, Y-axis, and Z-axis are pointing are the negative directions of the X-axis, Y-axis, and Z-axis, respectively. The negative directions of the X-axis, Y-axis, and Z-axis are assumed as the −X direction, −Y direction, and −Z direction, respectively. The directions of the X-axis, Y-axis, and Z-axis are referred to as the X-direction, Y-direction, and Z-direction, respectively, irrespective of whether these directions are negative or positive. The same applies to the subsequent figures and descriptions. The directions of the XYZ axes illustrated in the other figures correspond to those of the XYZ axes in FIG. 2. The orientations of the X-axis, Y-axis, and Z-axis for the cartridge 100 are based on a condition where the printing device 20 is disposed on a horizontal plane parallel to the X-direction and Y-direction and the cartridge 100 is mounted on the printing device 20.

Figure 6:
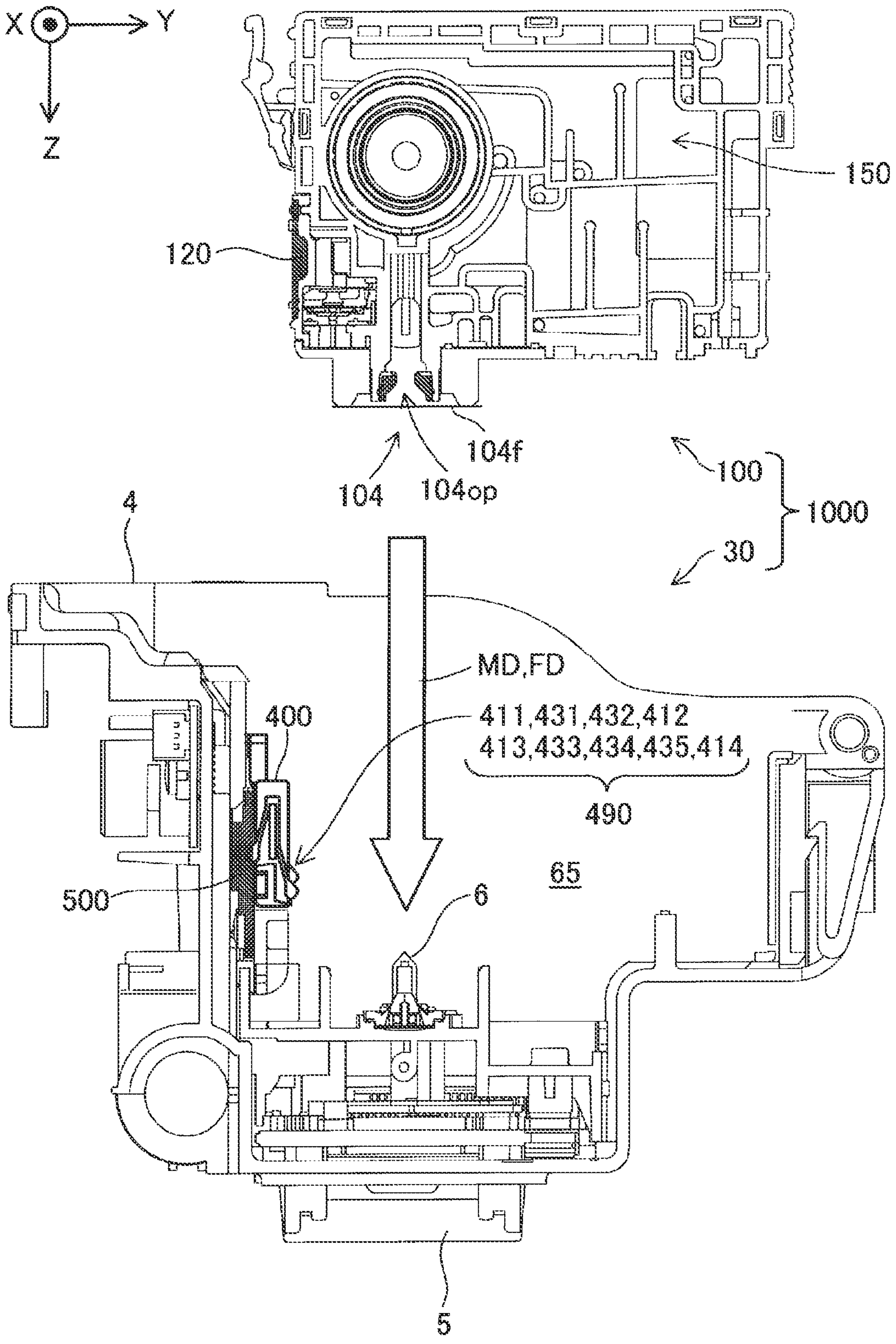
FIG. 6 is a diagram illustrating the way that a cartridge is mounted on a mount portion of a carriage.

As illustrated in FIG. 2 and FIG. 3, the outward shape of the cartridge 100 is approximately rectangular. As illustrated in FIG. 2, the cartridge 100 includes a main body 101 forming an outer shell and the circuit board 120 mounted on the main body 101. The main body 101 includes a front wall 101*wf*, which is a wall in the −Y direction, and a bottom wall 101*wb*, which is a wall in the +Z direction. The main body 101 also includes a liquid container 150 for containing an ink, which is a liquid. The front wall 101*wf*, which crosses the bottom wall 101*wb*, is substantially perpendicular to the bottom wall 101*wb* in the present embodiment. The bottom wall 101*wb* of the main body 101 includes a liquid supplier 104 that, when mounted on the mount portion 4 of the carriage 30, supplies a liquid of the liquid container 150 to the carriage 30. The liquid supplier 104 communicates with the liquid container 150. An opening 104*op* of the liquid supplier 104 is sealed with a film 104*f*. The film 104*f* is broken by mounting the cartridge 100 onto the carriage 30, and the liquid introducer 6 included in the carriage 30 illustrated in FIG. 6 is inserted into the liquid supplier 104. The ink contained in the liquid container 150 is supplied through the liquid introducer 6 to the print head 5 of the printing device 20. As the ink in the liquid container 150 is consumed, air is introduced from an atmosphere release hole (not illustrated) to the liquid container 150.

A film surface sealed with the film 104*f* is herein assumed as an opening end of the liquid supplier 104. The Z-direction is a direction perpendicular to the opening end of the liquid supplier 104. Additionally, the +Z direction is the same as the opening direction of the liquid supplier 104. Additionally, the X-direction is the array direction of a plurality of cartridges 100A to 100D mounted on the carriage 30 and is the width direction of the cartridge 100. Additionally, in the present embodiment, the Z-direction is a direction along the gravity direction, the +Z direction is the gravity direction, and the −Z direction is the antigravity direction. In addition, the direction in which the cartridge 100 is mounted on the carriage 30 of the printing device 20 is a mounting direction MD, and a direction including the component of the mounting direction MD is assumed as a first direction FD. In the present embodiment, the mounting direction MD and the first direction FD are the same direction, which is the +Z direction. In other embodiments, the mounting direction MD and the first direction FD may not be the same direction. The first direction FD is a direction extending straight and is the opening direction of the liquid supplier 104 in the present embodiment. The first direction FD is a direction substantially along a front surface 120*fa* of the circuit board 120. In other embodiments, when the front surface 120*fa* is inclined relative to the mounting direction MD, the mounting direction MD and the first direction FD are different directions, not the same direction.

The circuit board 120 is mounted on the front wall 101*wf* of the main body 101. The circuit board 120 includes a terminal group 290 made up of a plurality of terminals. In the present embodiment, nine terminals make up the terminal group 290. The terminal group 290 will be described below in more detail.

The cartridge 100 is collected, for example, by a trader after the liquid contained in the cartridge 100 has been consumed, and then the liquid container 150 is again filled with a liquid. Thereby, the cartridge 100 is restored to the initial state, that is, the cartridge 100 is reused. In refilling the liquid container 150 of the cartridge 100 with a liquid, at least part of information stored in a memory of the circuit board 120 is overwritten. The memory will be described below in more detail.

Figure 4:
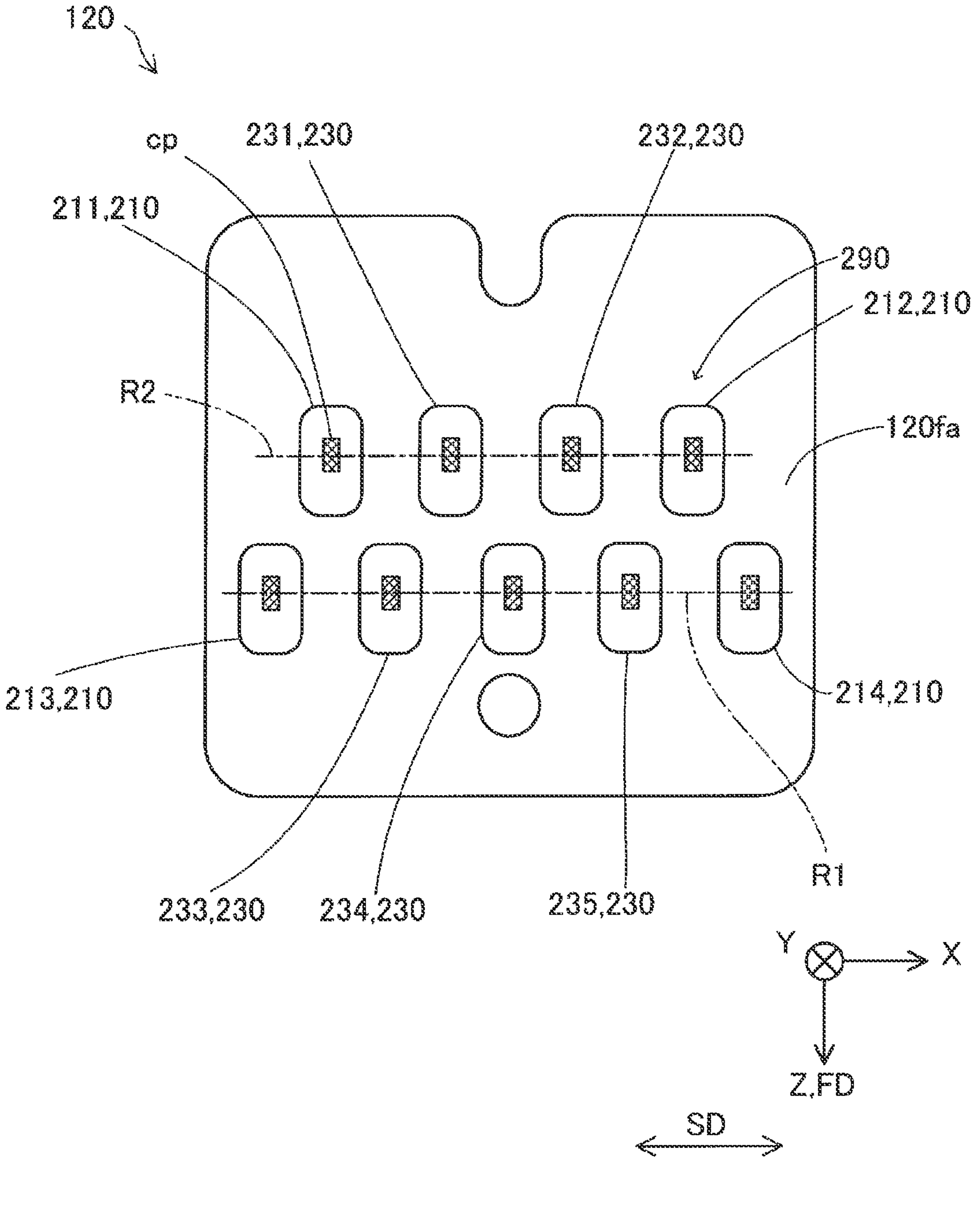
FIG. 4 is a first diagram illustrating a configuration of a circuit board according to the present embodiment.
Figure 5:
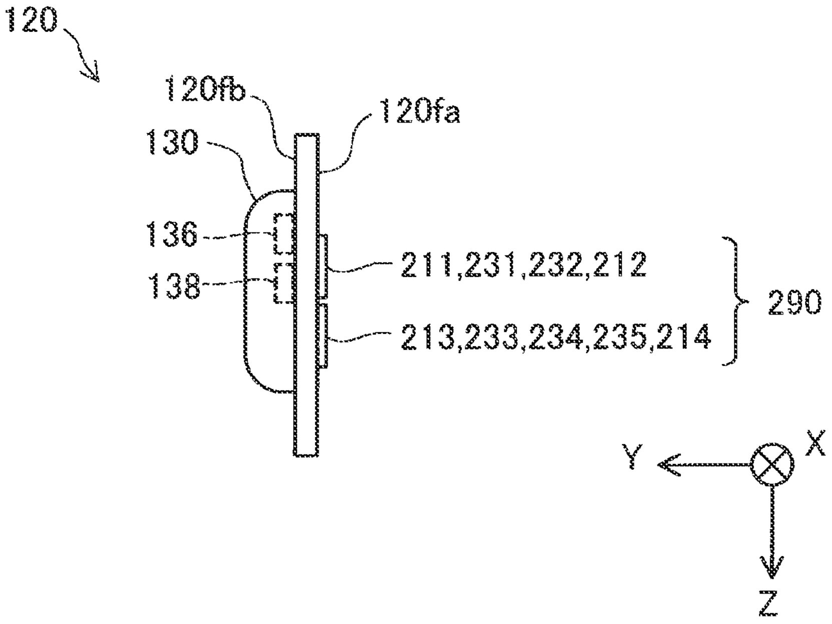
FIG. 5 is a second diagram illustrating a configuration of the circuit board.

FIG. 4 is a first diagram illustrating a configuration of the circuit board 120 according to the present embodiment. FIG. 5 is a second diagram illustrating the configuration of the circuit board 120. The circuit board 120 includes the terminal group 290 on the front surface 120*fa* as illustrated in FIG. 4 and a nonvolatile memory 130 on a back surface 120*fb* as illustrated in FIG. 5. As illustrated in FIG. 4, the terminal group 290 includes a memory terminal group 230 and a mount detection terminal group 210.

The memory terminal group 230 is terminals for the memory 130. The memory terminal group 230 includes a data terminal 235, a clock terminal 232, a power supply terminal 233, a reset terminal 231, and a ground terminal 234. The data terminal 235 is used for transmitting and receiving various types of data, such as ink color data and consumption data regarding the consumption of a liquid contained in each cartridge 100, between the memory 130 and the printing device 20.

The mount detection terminal group 210 includes a first detection terminal 211, a second detection terminal 212, a third detection terminal 213, and a fourth detection terminal 214. The four detection terminals 211 to 214 are arranged at four corners of the set of the memory terminal group 230.

The terminals 211, 212, 213, 214, 231, 232, 233, 234, and 235 are each formed in a substantially rectangular shape and are arranged to form two rows perpendicular to the first direction FD. That is, the two rows are parallel to the second direction SD, which is perpendicular to the first direction FD. The two rows are aligned in the first direction FD. Of the two rows, a row located toward one end of the first direction FD is referred to as a first row R1, and a row located toward the opposite end of the first direction FD is referred to as a second row R2. A contact point cp in contact with a device terminal described below is located at the center of each of the terminals 211, 212, 213, 214, 231, 232, 233, 234, and 235.

Each of the terminals 211, 212, 213, 214, 231, 232, 233, 234, and 235 of the terminal group 290 is coupled to the memory 130 through a wiring pattern layer on the front or back surface of the circuit board 120 or a through hole disposed in the circuit board 120, which is not illustrated in the figures.

The memory 130 illustrated in FIG. 5 is a NAND-type flash memory. In another embodiment, the memory 130 may be a memory, such as a NOR-type flash memory or an electrically erasable programmable read-only memory (EEPROM). The memory 130 includes a memory controller 136 and a storage 138 constituted of a plurality of memory cells. Each memory cell constituting the storage 138 is capable of storing 1 bit of data. In addition, the memory 130 is capable of performing data communication with the device controller 40 of the printing device 20.

Figure 7:
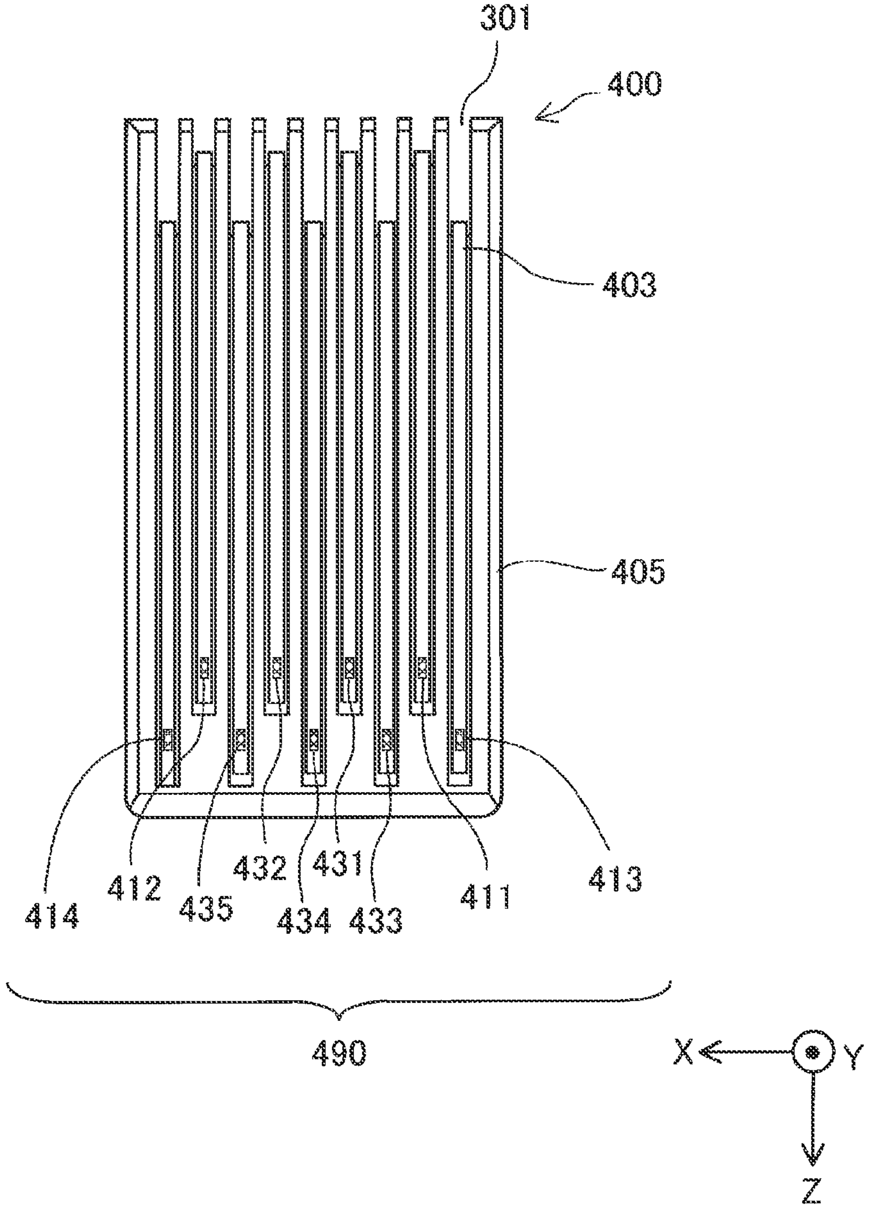
FIG. 7 is a first diagram illustrating a coupling mechanism.
Figure 8:
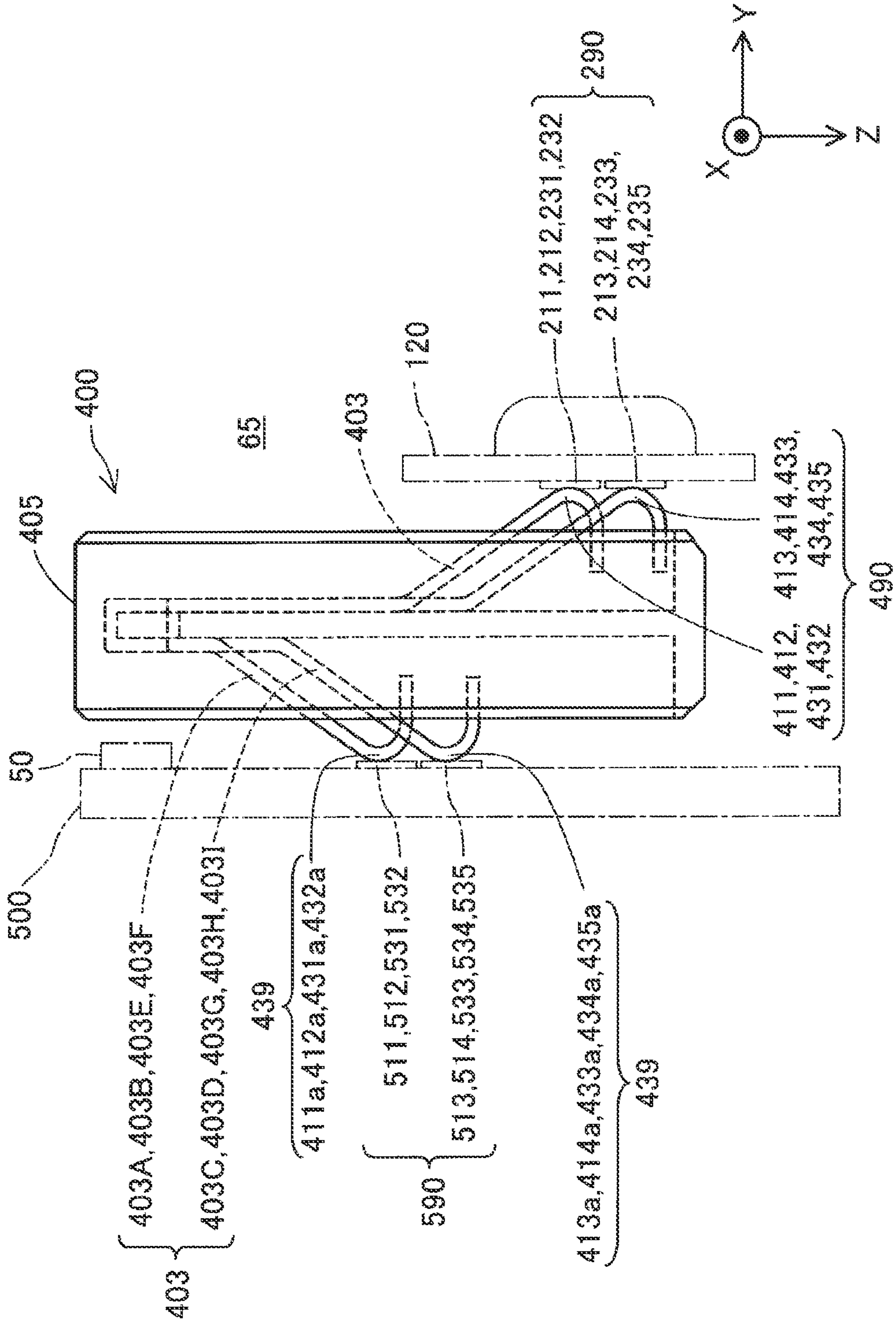
FIG. 8 is a second diagram illustrating the coupling mechanism.

FIG. 6 is a diagram illustrating the way that the cartridge 100 is mounted on the mount portion 4 of the carriage 30. FIG. 7 is a first diagram illustrating the coupling mechanism 400. FIG. 8 is a second diagram illustrating the coupling mechanism 400.

As illustrated in FIG. 6, the carriage 30 includes the mount portion 4, the print head 5, the liquid introducer 6, the coupling mechanism 400, and the sub-control board 500. The mount portion 4 forms a mount chamber 65 in which the cartridges 100 are mounted. The print head 5, which includes a plurality of nozzles and a plurality of piezoelectric elements, forms a dot on the printing medium PA by ejecting an ink droplet from each nozzle in accordance with a voltage applied to each piezoelectric element. The liquid introducer 6 is disposed on the print head 5 to supply ink from the cartridge 100 to the print head 5. In the present embodiment, four liquid introducers 6, the number of which corresponds to the number of cartridges 100A to 100D, are provided. The coupling mechanism 400 electrically couples the sub-control board 500 to the circuit board 120 of the cartridge 100. In the present embodiment, four coupling mechanisms 400, the number of which corresponds to the number of cartridges 100A to 100D, are provided. As illustrated in FIG. 8, the sub-control board 500 includes a relay unit 50. The relay unit 50, in conjunction with the device controller 40, performs control related to the cartridge 100.

As illustrated in FIG. 6, the cartridge 100 is mounted on the mount portion 4 of the printing device 20 by being inserted in the mounting direction MD. In this way, the cartridge 100 is removably mounted on the printing device 20. In addition, when the cartridge 100 is properly mounted on the printing device 20, the circuit board 120 is electrically coupled to the device controller 40 of the printing device 20 via the coupling mechanism 400, the sub-control board 500, and the bus 46.

As illustrated in FIG. 7, the coupling mechanism 400 includes a terminal holder 405 and a plurality of contact formation members 403 having conductivity and elasticity held in the terminal holder 405. The terminal holder 405 has a plurality of slits 301. The contact formation members 403 are inserted into the slits 301. In the present embodiment, each coupling mechanism 400 is provided with nine contact formation members 403, the number of which is the same as the number of terminals of the terminal group 290.

As illustrated in FIG. 8, the contact formation member 403 is a member that electrically couples the terminal group 290 to board terminals 590 of the sub-control board 500. The board terminals 590 are provided for each mount chamber 65. Additionally, nine board terminals 590, the number of which corresponds to the number of terminals of the terminal group 290, are provided. Reference numerals 511, 512, 513, 514, 531, 532, 533, 534, and 535 are used to refer to the nine board terminals 590 when they are discriminated from each other. Of the contact formation member 403, a portion protruding toward the mount chamber 65 forms a device terminal 490 in contact with the terminal group 290. Additionally, of the contact formation member 403, a portion protruding toward the sub-control board 500 forms a relay terminal 439 in contact with the board terminal 590. When the nine contact formation members 403 are discriminated from each other, characters A to I are added to the ends of the reference numerals. Additionally, reference numerals 411, 412, 413, 414, 431, 432, 433, 434, and 435 are used to refer to the nine device terminals 490 when they are discriminated from each other. Additionally, reference numerals 411*a*, 412*a*, 413*a*, 414*a*, 431*a*, 432*a*, 433*a*, 434*a*, and 435*a* are used to refer to the nine relay terminals 439 when they are discriminated from each other. Additionally, reference numerals 511, 512, 513, 514, 531, 532, 533, 534, and 535 are used to refer to the nine board terminals 590 when they are discriminated from each other.

The contact formation member 403A including the device terminal 411 and the relay terminal 411*a* electrically couples the first detection terminal 211 to the board terminal 511. The contact formation member 403B including the device terminal 412 and the relay terminal 412*a* electrically couples the second detection terminal 212 to the board terminal 512. The contact formation member 403C including the device terminal 413 and the relay terminal 413*a* electrically couples the third detection terminal 213 to the board terminal 513. The contact formation member 403D including the device terminal 414 and the relay terminal 414*a* electrically couples the fourth detection terminal 214 to the board terminal 514. The contact formation member 403E including the device terminal 431 and the relay terminal 431*a* electrically couples the reset terminal 231 to the board terminal 531. The contact formation member 403F including the device terminal 432 and the relay terminal 432*a* electrically couples the clock terminal 232 to the board terminal 532. The contact formation member 403G including the device terminal 433 and the relay terminal 433*a* electrically couples the power supply terminal 233 to the board terminal 533. The contact formation member 403H including the device terminal 434 and the relay terminal 434*a* electrically couples the ground terminal 234 to the board terminal 534. The contact formation member 403I including the device terminal 435 and the relay terminal 435*a* electrically couples the data terminal 235 to the board terminal 535.

Figure 9:
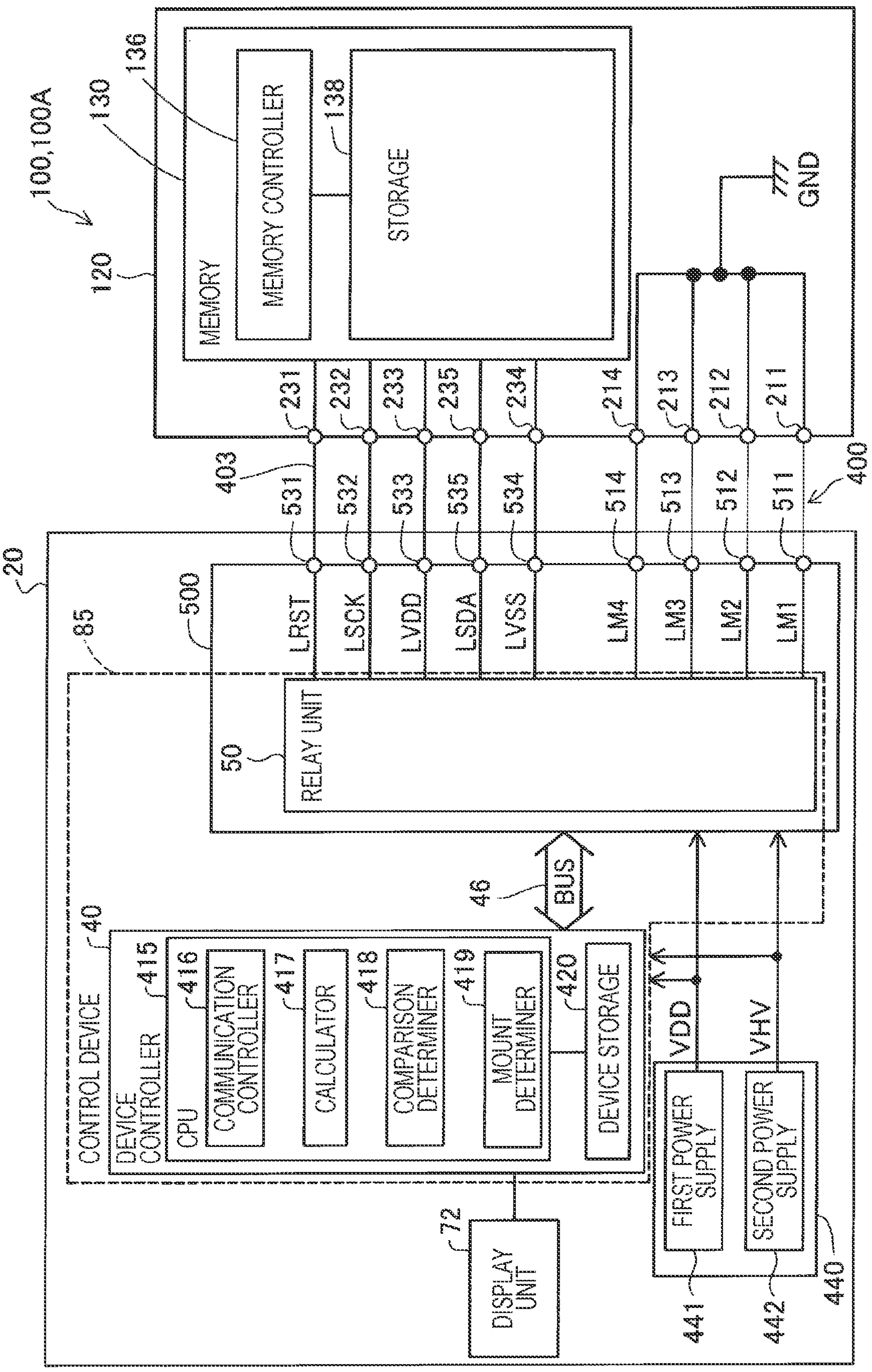
FIG. 9 is a diagram illustrating a configuration of a printing device together with one cartridge.
Figure 11:
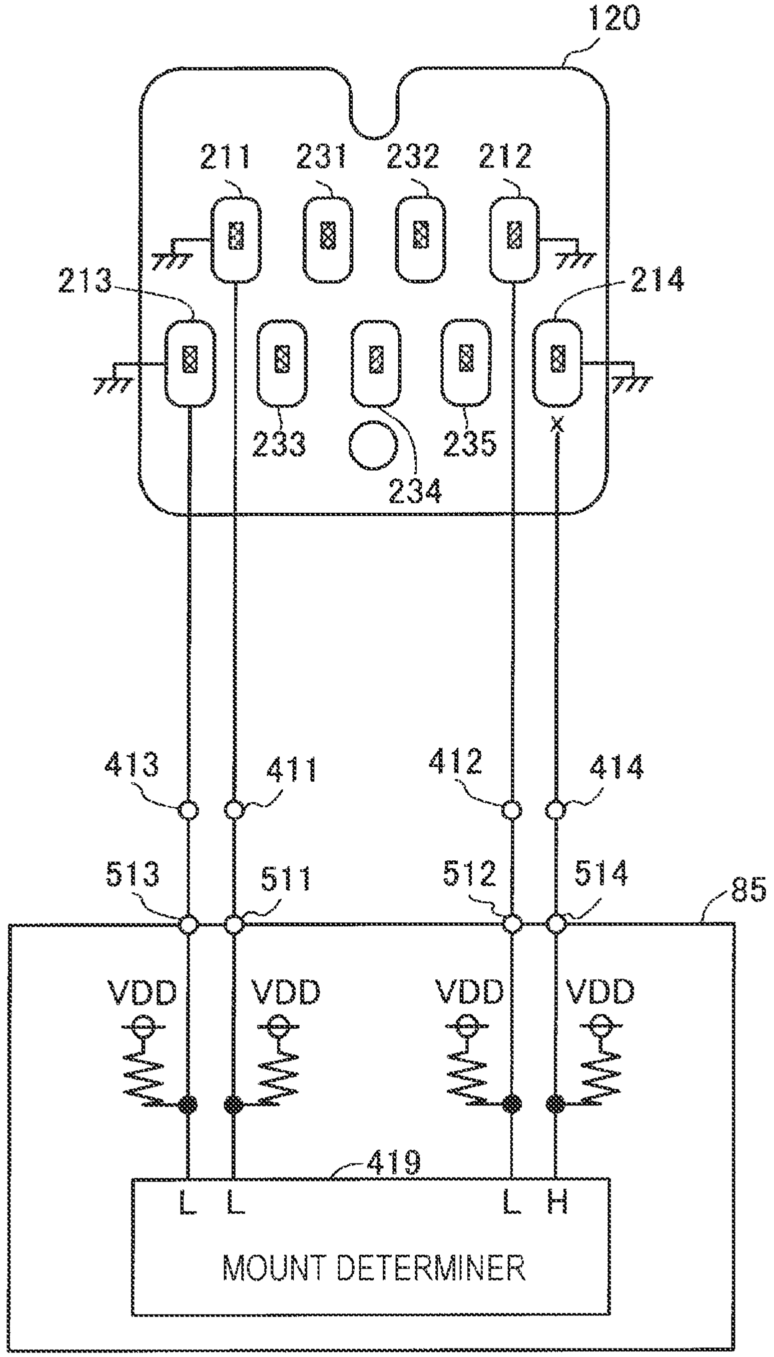
FIG. 11 is a diagram illustrating mounting determination.

FIG. 9 is a diagram illustrating the configuration of the printing device 20 together with one cartridge 100. FIG. 10 is a diagram illustrating the storage 138. FIG. 11 is a diagram illustrating mounting determination.

As illustrated in FIG. 9, the memory 130 of the circuit board 120 includes the memory controller 136 and the storage 138. The memory controller 136 controls operations of the memory 130. For example, the memory controller 136 performs operations of writing and reading data to and from the storage 138 according to commands transmitted from the printing device 20.

As illustrated in FIG. 10, the storage 138 includes a storage area consisting of a plurality of memory cells designated by addresses A0 to An. A storage area having at least addresses A0 to A6 is a rewritable area in which replacement with new data is permissible. This rewritable area is set such that, in addition to readout of data, erasure of previously stored data and writing of new data are permissible. That is, the rewritable area is a read/write area. For example, the addresses of a rewritable area and the addresses of a read-only area, in which only reading is permissible, are specified in advance by the memory controller 136. Thereby, the rewritable area and the read-only area are set.

A storage area designated by the addresses A0 to A3 is an area for storing manufacturing information regarding the manufacture of the cartridge 100. The area for storing the manufacturing information includes a storage area designated by address A0 for storing the number of refills and a storage area designated by address A1 for storing the date of manufacture of the cartridge 100. The area for storing the manufacturing information further includes a storage area designated by address A2 for storing the serial number and a storage area designated by address A3 for storing the type of a liquid contained in the cartridge 100.

The number of refills is the number of times that after the liquid contained in the cartridge 100 has been consumed, the liquid container 150 of the cartridge 100 is again filled with a liquid. In the storage area at address A0, a value representing zero is stored as the number of refills when the cartridge 100 is manufactured, and the value is incremented by one each time the cartridge 100 is refilled with a liquid. The date of manufacture is the date of manufacture of the cartridge 100. In the storage area at address A1, a value representing the date of manufacture is stored as the date of manufacture, regardless of whether the liquid container 150 of the cartridge 100 has been refilled with a liquid. In other embodiments, the date of manufacture may be the date when the liquid container 150 of the cartridge 100 is first filled with a liquid or when the liquid container 150 is refilled with a liquid. That is, in the storage area at address A1, the date of manufacture may be updated to have a new value each time the liquid container 150 of the cartridge 100 is refilled with a liquid. The serial number is an identifier for identifying the cartridge 100. In the present embodiment, in the storage area at address A2, the serial number has the same value as that at the time of manufacture even when the liquid container 150 of the cartridge 100 is refilled with a liquid. The liquid type is, for example, information indicating an ink color. In the storage area at address A3, each time the liquid container 150 of the cartridge 100 is filled with a liquid, the liquid type is updated to have a value representing the type of the liquid used for filling.

The storage area designated by address A4 is an area for storing an electronic signature of manufacturing information. The electronic signature is generated using manufacturing information stored in the storage areas at addresses A0 to A3 and is stored in the storage area at address A4. In more detail, the electronic signature stored at address A4 is information in which a hash value, which is generated by converting manufacturing information by using a hash function, is encrypted with the secret key corresponding to the public key. The electronic signature at address A4 is generated and updated using the manufacturing information each time the liquid container 150 of the cartridge 100 is filled with a liquid.

The storage area designated by address A5 is an area for storing a first error-detecting code of the manufacturing information. In the present embodiment, the first error-detecting code is a cyclic redundancy check (CRC) value that is a value for checking used for CRC. The first error-detecting code is generated using manufacturing information stored in the storage area at addresses A0 to A3 and is stored in the storage area at address A5.

The storage area designated by address A6 is an area for storing consumption data of ink of the cartridge 100. The consumption data is, for example, a value indicating the ratio [%] of the consumed amount of ink [mg] to the initial filling amount of ink [mg] measured prior to consumption. The consumption data at address A6 is updated by transmitting a command for writing consumption data from a control device 85 of the printing device 20 to the memory controller 136 of the cartridge 100 to which the consumption data is to be written, each time a liquid with an amount larger than or equal to a predetermined amount is consumed from the cartridge 100 by a printing operation and a cleaning operation of the printing device 20.

As described above, the manufacturing information, the electronic signature, the first error-detecting code, and the consumption data are stored in the rewritable area of the storage area.

As illustrated in FIG. 9, the sub-control board 500 includes a reset signal line LRST, a clock signal line LSCK, a power supply signal line LVDD, a data signal line LSDA, a ground signal line LVSS, a first detection signal line LM1, a second detection signal line LM2, a third detection signal line LM3, and a fourth detection signal line LM4. The reset signal line LRST electrically couples the relay unit 50 to the board terminal 531. The clock signal line LSCK electrically couples the relay unit 50 to the board terminal 532. The power supply signal line LVDD electrically couples the relay unit 50 to the board terminal 533. The ground signal line LVSS electrically couples the relay unit 50 to the board terminal 534. The data signal line LSDA electrically couples the relay unit 50 to the board terminal 535. The first detection signal line LM1 to the fourth detection signal line LM4 electrically couple the relay unit 50 to the board terminals 511 to 514. The relay unit 50, which includes a central processing unit (CPU), a storage device, and other components, relays data and power supplied via the bus 46 and a power supply line to transmit the data and power to the cartridge 100. In other embodiments, the relay unit 50 may have some functions, described below, of the device controller 40.

The printing device 20 includes the display unit 72 mentioned above, a power supply 440, and the control device 85. The control device 85 includes the device controller 40 and the relay unit 50. The power supply 440 includes a first power supply 441 that generates a first power supply voltage VDD and a second power supply 442 that generates a second power supply VHV. The first power supply voltage VDD is a normal power supply voltage for use in a logic circuit and is rated at 3.3 V. The second power supply VHV is a high voltage used for driving the print head 5 to eject ink and is rated, for example, at 42 V. These voltages VDD and VHV are supplied to the sub-control board 500 and are also supplied to other components, such as circuits, as desired.

The device controller 40 includes a CPU 415 and a device storage 420. The CPU 415 executes various programs stored in the device storage 420 to control the operations of the printing device 20. For example, the device controller 40 controls the operations of the display unit 72 and controls the operations of the relay unit 50. In addition, the CPU 415 executes various programs stored in the device storage 420 to function as a communication controller 416, a calculator 417, a comparison determiner 418, and a mount determiner 419. At least some of the functions of the CPU 415 are not limited to software and may be implemented by hardware such as circuits.

The communication controller 416 exchanges data with the memory controller 136 of the memory 130 via the bus 46 and the data signal line LSDA. For example, the communication controller 416 exchanges data with the memory controller 136 by transmitting a read command for reading out data from the memory 130 to the memory controller 136 serving as the target and transmitting a write command for writing data to the memory 130 to the memory controller 136 serving as the target.

The calculator 417 calculates a second error-detecting code from the manufacturing information of the memory 130 obtained from the memory 130 via the communication controller 416. The second error-detecting code is a value generated using the same type of error-detecting method, that is, the same algorithm as that used for a first error-detecting code and, in the present embodiment, cyclic redundancy check (CRC) value that is a value for checking used for CRC.

The comparison determiner 418 compares the first error-detecting code stored at address A5 in the memory 130 with the second error-detecting code calculated by the calculator 417. In addition, the comparison determiner 418 performs verification of the electronic signature stored at address A4 in the memory 130. In more detail, the comparison determiner 418 obtains the manufacturing information and the electronic signature stored at addresses A0 to A4 in the memory 130 via the communication controller 416 and generates a first hash value, as a hash value, from the obtained manufacturing information by using a hash function. This hash function is the same function as the hash function used for the electronic signature stored at address A4 in the memory 130. The comparison determiner 418 also obtains a second hash value, as a hash value, by decoding the obtained electronic signature with the public key. The comparison determiner 418 then performs verification of the electronic signature by comparing the first hash value with the second hash value. If the first hash value matches the second hash value, then it may be determined that the verification of the electronic signature is successful. The comparison determiner 418 performs the verification of the electronic signature mentioned above when the first error-detecting code matches the second error-detecting code.

The comparison determiner 418 also performs a process in accordance with a comparison result between the first error-detecting code and the second error-detecting code and a verification result of the electronic signature. This will be described below in more detail.

The mount determiner 419 determines whether the cartridge 100 is mounted on the mount portion 4. The first to fourth detection terminals 211 to 214 of the circuit board 120 are electrically coupled via the corresponding coupling mechanism 400, the board terminals 511 to 514, and so on to the mount determiner 419. The first to fourth detection terminals 211 to 214 of the circuit board 120 are grounded as illustrated in FIG. 11. Electrical wires that couple the board terminals 511 to 514 to the mount determiner 419 are each coupled through a pull-up resistor to the first power supply voltage VDD rated at 3.3 V.

In the example illustrated FIG. 11, among the first to fourth detection terminals 211 to 214 of the circuit board 120, the first to third detection terminals 211 to 213 are excellently coupled to the corresponding device terminals 411 to 413. In contrast, the fourth detection terminal 214 is in poor contact with the corresponding device terminal 414. The voltages of wires of the three device terminals 411, 412, and 413 in an excellently coupled state are at a low level whereas the voltage of the wire of the device terminal 414 in a poorly coupled state is at a high level. Accordingly, by examining the voltage level of each of these wires, the mount determiner 419 may determine whether the contact condition of the corresponding one of the four detection terminals 211, 212, 213, and 214 is excellent or poor. In the present embodiment, if the voltage level of each of wires of the four device terminals 411 to 414 is low, the mount determiner 419 determines that the cartridge 100 is properly mounted; otherwise, the mount determiner 419 determines that the cartridge 100 is not properly mounted.

Figure 12:
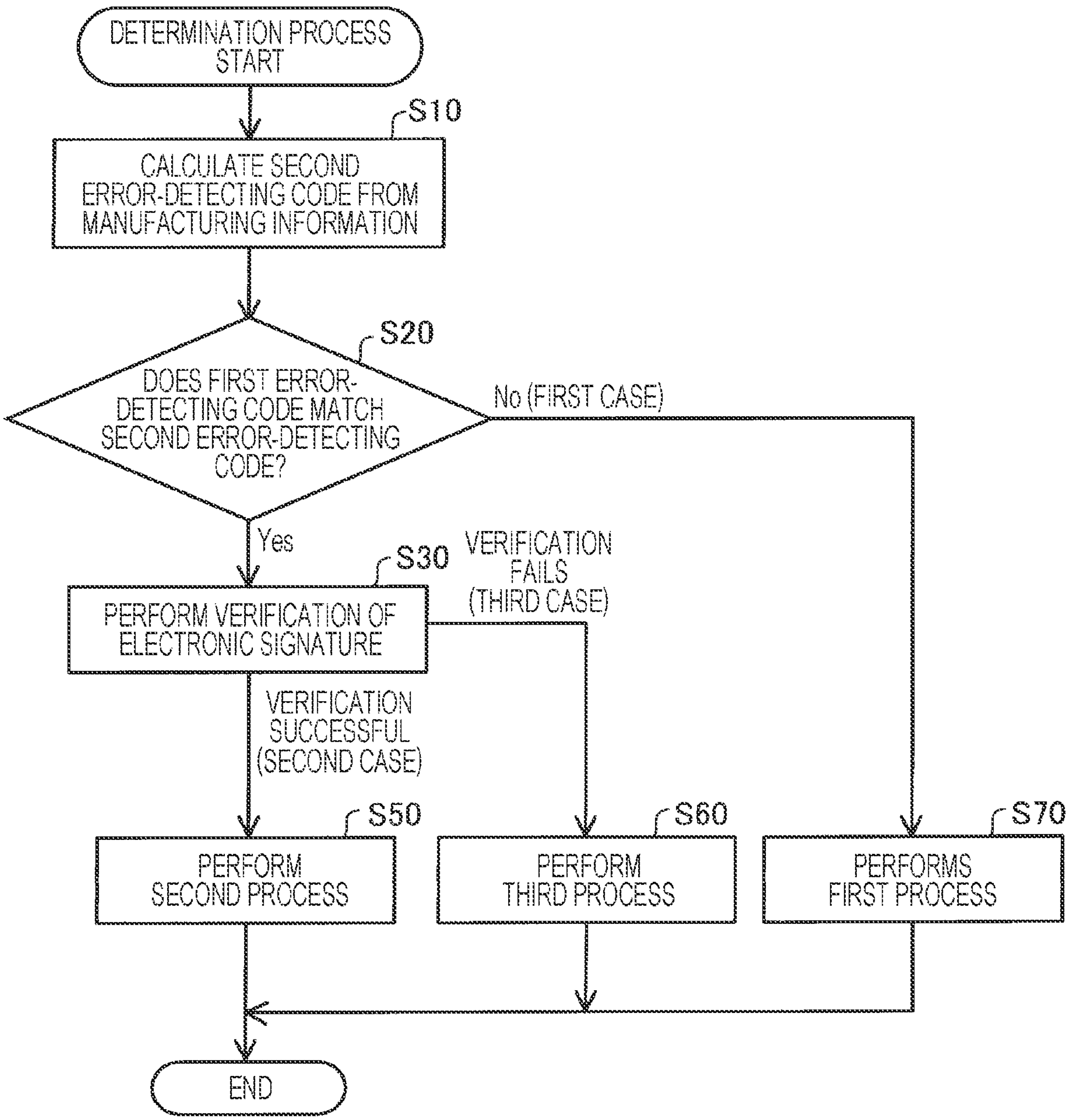
FIG. 12 is a flowchart illustrating a determination process for a cartridge performed by the printing device.

FIG. 12 is a flowchart illustrating a determination process for the cartridge 100 performed by the printing device 20. The determination process is performed at a predetermined timing. Examples of the predetermined timing include a first timing at which the power supply of the printing device 20 is turned on and a second timing at which it is determined by the mount determiner 419 that at least one cartridge 100 of the four cartridges 100 is newly mounted on the mount portion 4. In addition, the determination process is performed for each of the cartridges 100A to 100D mounted on the mount portion 4. In the case of the second timing, the determination process may be performed only for the newly mounted cartridge 100.

In the determination process, first, at step S10, the calculator 417 calculates a second error-detecting code from the manufacturing information of the memory 130 obtained from the memory 130. Subsequently, at step S20, the comparison determiner 418 compares the first error-detecting code with the second error-detecting code and determines whether the first error-detecting code matches the second error-detecting code. The first error-detecting code is obtained from the memory 130 via the communication controller 416 at or prior to step S20.

In the first case where, at step S20, the comparison determiner 418 determines that the first error-detecting code does not match the second error-detecting code, at step S70, the comparison determiner 418 performs a first process related to the first case. The first process is, for example, a process related to data stored in the memory 130, and in particular to corruption of the manufacturing information. The first process includes a first output process that causes the display unit 72 to display first information related to the first case. Specifically, the first output process is a process of displaying that data corruption has occurred in the memory 130 of the target cartridge 100 and, because of the data corruption, the target cartridge 100 is not recognized by the printing device 20, as the first information on the display unit 72 of the printing device 20. The first output process may prompt the user to replace the cartridge 100 mounted on the mount portion 4 with the cartridge 100 in which data in the memory 130 has not been corrupted. The comparison determiner 418 may perform, as the first process, another process in addition to, or instead of, the first output process. Examples of the other process include a process of prohibiting use of some of the functions, such as a monochrome printing function, a color printing function, and a high-quality printing function, of the printing device 20.

If, at step S20, the comparison determiner 418 determines that the first error-detecting code matches the second error-detecting code, then at step S30 the comparison determiner 418 performs verification of the electronic signature. When, at step S30, the first hash value matches the second hash value, that is, in a second case where verification of the electronic signature is successful, then at step S50 the comparison determiner 418 performs a second process related to the second case. The second process is a process related to the fact that manufacturing information, such as the number of refills, is written to the memory 130 by an intended manufacturer. The second process includes a second output process that causes the display unit 72 to display second information related to the second case. The second information is information different from the first information. Specifically, the second output process is a process of displaying that, for the target cartridge 100, verification of the electronic signature is successful, printing operations are able to be performed, and the cartridge 100 is properly mounted on the mount portion 4, as the second information on the display unit 72 of the printing device 20. The second output process enables the user to recognize that printing is able to be performed using the cartridge 100 mounted on the mount portion 4. The comparison determiner 418 may perform, as the second process, another process in addition to, or instead of, the second output process. Examples of the other process include a process of receiving an instruction from the user and performing printing without restricting the functions of the printing device 20.

When, at step S30, the first hash value does not match the second hash value, that is, in a third case where verification of the electronic signature has failed, then at step S60 the comparison determiner 418 performs a third process related to the third case. The third process is a process related to the fact that manufacturing information, such as the number of refills, is written to the memory 130 by an unintended manufacturer. The third process includes a third output process that causes the display unit 72 to display third information related to the third case. The third information is information different from the first information and the second information. Specifically, the third output process is a process of displaying that, for the target cartridge 100, verification of an electronic signature has failed and the cartridge 100 is manufactured by an unintended manufacturer, as the third information on the display unit 72 of the printing device 20. The third output process enables the user to recognize that the cartridge 100 is not a genuine product. The comparison determiner 418 may perform, as the third process, another process in addition to, or instead of, the third output process. Examples of the other process include a process of inhibiting printing operations of the printing device 20.

According to the embodiment described above, since the memory 130 stores the first error-detecting code and the electronic signature as illustrated in FIG. 10, by using the first error-detecting code, the printing device 20 may determine whether manufacturing information, which is information stored in the memory 130, has been corrupted. Thus, prior to performing verification of the electronic signature, whether data corruption has occurred in the memory 130 is determined by using the first error-detecting code. This may reduce the possibility of data corruption causing the printing device 20 to determine that, based on a verification result of the electronic signature, the cartridge 100 is not a genuine product even though the cartridge 100 is a genuine product. Specifically, as illustrated in FIG. 12, prior to performing verification of the electronic signature, at step S20, the printing device 20 determines whether the first error-detecting code matches the second error-detecting code, and, if so, at step S30, the printing device 20 performs verification of the electronic signature. Thus, verification of the electronic signature is performed when, at step S20, it is determined that corruption of the manufacturing information, which is data stored in the memory 130, has not occurred. This may reduce the possibility of data corruption causing the printing device 20 to determine that, based on a verification result of the electronic signature, the cartridge 100 is not a genuine product even though the cartridge 100 is a genuine product.

In addition, according to the present embodiment described above, as indicated at steps S50, S60, and S70 in FIG. 12, the control device 85 may perform the first process, the second process, and the third process respectively related to the first case, the second case, and the third case. In addition, according to the present embodiment described above, in each of the first case, second case, and third case, information related to the case is displayed by the display unit 72, which may notify the user of a processing result of the comparison determiner 418. In particular, in the first case where the first error-detecting code does not match the second error-detecting code, the printing system 1000 informs the user that, for example, data corruption has occurred, and, in the third case where verification of the electronic signature has failed, the printing system 1000 informs the user that, for example, verification of an electronic signature has failed. This enables the user to easily grasp whether an error regarding the cartridge 100 that has occurred in the printing system 1000 is caused by data corruption in the memory 130 or by a failure in the verification of an electronic signature.

In addition, according to the embodiment described above, the manufacturing information, electronic signature, and first error-detecting code illustrated in FIG. 10 are stored in a write/erase area of the storage 138. Thereby, when the cartridge 100 is refilled with a liquid, a storage area at the same address of the memory 130 may easily be reused to update information to be stored in the memory 130.

B. Other Embodiments

B-1. First Other Embodiment

In the embodiment described above, the manufacturing information illustrated in FIG. 10 is the number of refills, date of manufacture, serial number, and liquid type. However, the manufacturing information may be other information related to the manufacture of the cartridge 100 when the other information includes at least the number of refills. For example, the manufacturing information may include a value representing the amount of filled liquid.

B-2. Second Other Embodiment

In the embodiment described above, in the storage 138 of the memory 130, each of the rewritable area and the read-only area is set by specifying the addresses of the storage 138 in advance. However, the areas may be used differently using a rewritable memory, such as an EEPROM, and a memory incapable of being rewritten, such as a mask ROM.

B-3. Third Other Embodiment

In the embodiment described above, the first information to the third information are displayed on the display unit 72 of the printing device 20. However, the present disclosure is not limited to this. For example, the first information to the third information may be displayed on a display unit of the computer 90 of the printing system 1000.

B-4. Fourth Other Embodiment

The present disclosure is not limited to an ink jet printer and its cartridges and may be applied to cartridges that are mounted on any printing device that ejects a liquid other than ink. For example, the present disclosure may be applied to various printing devices and their cartridges as follows:

(1) Image recording devices such as facsimile machines, (2) Printing devices that eject color materials for use in manufacture of color filters for image display devices, such as liquid crystal displays, (3) Printing devices that eject electrode materials used for formation of electrodes of organic electro luminescence displays and field emission displays (FEDs), (4) Printing devices that eject liquids containing bioorganic substances used for biochip fabrication, (5) Sample printing devices as precision pipettes, (6) Lubricating oil printing devices, (7) Resin liquid printing devices, (8) Printing devices that perform pinpoint ejection of lubricating oil to precision machines, such as watches and cameras, (9) Printing devices that eject a transparent resin liquid, such as an ultraviolet-curing resin liquid, for forming micro-hemispherical lenses or the like used in optical communication elements and so on,

(10) Printing devices that eject an acid or alkaline etchant for etching substrates or the like, and

(11) Printing devices with liquid ejecting heads that eject very small amounts of any other liquid droplets.

The term liquid droplet refers to the state of a liquid ejected from a printing device and includes the state of a liquid that leaves a granular, tear-shaped, or thread-like tail. In addition, the term liquid as used herein may be a material that the printing device can eject. For example, the liquid may be a material in a state where the substance is in the liquid phase, and examples of the liquid include a material in a liquid state in which the viscosity is high or low and a material in a liquid state, such as sol, gel water, and other inorganic solvents, organic solvents, solutions, liquid resins, and liquid metals. In addition, the liquid includes not only a liquid as one state of a substance but also ones in which particles of a functional material made of a solid material, such as a pigment or metal particles, dissolve, disperse, or are mixed in a solvent. In addition, typical examples of the liquid include ink and liquid crystal as mentioned in the embodiment described above. The ink is assumed here to include various liquid compositions such as gel ink and hot melt ink, as well as typical water ink and oil ink.

C. Other Forms

The present disclosure is not limited to the embodiments described above and may be implemented in various configurations without departing from the spirit and scope of the disclosure. For example, the technical features of the embodiments corresponding to the technical features in the forms described below may be appropriately replaced or combined in order to solve some or all of the issues described above or to achieve some or all of the effects described above. In addition, the technical features may be appropriately deleted when they are not described as essentials herein.

(1) According to the first form of the present disclosure, a memory that is attached to a cartridge is provided. This memory stores manufacturing information including at least a number of refills, an electronic signature of the manufacturing information, and a first error-detecting code of the manufacturing information. The number of refills is a number of times that, after consumption of a liquid contained in the cartridge, the cartridge is refilled with the liquid. According to the form described above, since the memory stores the first error-detecting code and the electronic signature, by using the first error-detecting code, a printing device on which the cartridge is mounted may determine whether manufacturing information, which is data stored in the memory, has been corrupted. Thus, prior to performing verification of the electronic signature, whether data corruption has occurred in the memory is determined by using the first error-detecting code. This may reduce the possibility of data corruption causing the printing device to determine that, based on a verification result of the electronic signature, a cartridge is not a genuine product even though this cartridge is a genuine product.

(2) In the form described above, the memory may include a rewritable area in which replacement with new data is permissible, and the manufacturing information, the electronic signature, and the first error-detecting code may be stored in the rewritable area. According to the form described above, when the cartridge to which a memory is attached is refilled with a liquid, the memory may easily be reused.

(3) According to the second form of the present disclosure, a cartridge is provided. This cartridge includes a liquid container for containing a liquid, a liquid supplier configured to supply the liquid of the liquid container, and a memory. The memory stores manufacturing information including at least a number of refills, an electronic signature of the manufacturing information, and a first error-detecting code of the manufacturing information. The number of refills is a number of times that after consumption of the liquid contained in the cartridge, the cartridge is refilled with the liquid. According to the form described above, since the memory stores the first error-detecting code and the electronic signature, whether manufacturing information, which is data stored in the memory, has been corrupted may be determined by using the first error-detecting code. Thus, prior to performing verification of the electronic signature, whether data corruption has occurred in the memory is determined by using the first error-detecting code. This may reduce the possibility of data corruption causing the printing device to determine that, based on a verification result of the electronic signature, a cartridge is not a genuine product even though this cartridge is a genuine product.

(4) In the form described above, the memory may include a write/erase area in which writing and erasing of data is permissible, and the manufacturing information, the electronic signature, and the first error-detecting code may be stored in the write/erase area. According to the form described above, when the cartridge is refilled with a liquid, the memory may easily be reused.

(5) According to the third form of the present disclosure, a printing system is provided. This printing system includes the cartridge according to the form described above, and a control device. The control device includes a calculator configured to calculate a second error-detecting code from the manufacturing information of the memory, and a comparison determiner configured to compare the first error-detecting code of the memory with the calculated second error-detecting code. The comparison determiner is configured to, when the first error-detecting code matches the second error-detecting code, verify the electronic signature of the memory. According to the form described above, verification of the electronic signature is performed when the first error-detecting code matches the second error-detecting code, that is, when it is determined that corruption of the manufacturing information, which is data stored in the memory, has not occurred. This may reduce the possibility of data corruption causing a printing device to determine that, based on a verification result of the electronic signature, a cartridge is not a genuine product even though this cartridge is a genuine product.

(6) In the form described above, the comparison determiner is configured to, in a first case where the first error-detecting code does not match the second error-detecting code, perform a first process related to the first case, in a second case where verification of the electronic signature is successful, perform a second process related to the second case, and, in a third case where verification of the electronic signature has failed, perform a third process related to the third case. According to the form described above, the respective processes related to the first case, second case, and third case may be performed.

(7) In the form described above, a display unit may further be included, and the first process may include a first output process that causes the display unit to display first information that is related to the first case, the second process may include a second output process that causes the display unit to display second information that is related to the second case and that is different from the first information, and the third process may include a third output process that causes the display unit to display third information that is related to the third case and is different from the first information and the second information. According to the form described above, in each of the first case, second case, and third case, information related to the case is displayed by the display unit, which may notify the user of a processing result of the comparison determiner.

The present disclosure may be implemented in the forms of a method for manufacturing a memory, a method for controlling a printing system, and so on in addition to the forms described above.

What is claimed is:

1. A non-transitory memory that is attached to a cartridge, the non-transitory memory comprising:
- a first area that stores manufacturing information including at least a number of refills, the number of refills being a number of times that, after consumption of a liquid contained in the cartridge, the cartridge is refilled with the liquid;
- a second area, different form the first area, that stores an electronic signature of the manufacturing information; and
- a third area, different from the first area and the second area, that stores a first error-detecting code of the manufacturing information,
- wherein the second area is located between the first area and the third area.

2. The non-transitory memory according to claim 1, further comprising:
- a rewritable area in which replacement with new data is permissible,
- wherein the manufacturing information, the electronic signature, and the first error-detecting code are stored in the rewritable area.

3. A cartridge comprising:
- a liquid container for containing a liquid;
- a liquid supplier configured to supply the liquid of the liquid container; and
- a non-transitory memory,
- wherein the non-transitory memory includes
  - a first area that stores manufacturing information including at least a number of refills, the number of refills being a number of times that, after consumption of the liquid contained in the cartridge, the cartridge is refilled with the liquid,
  - a second area, different form the first area, that stores an electronic signature of the manufacturing information, and
  - a third area, different from the first area and the second area, that stores a first error-detecting code of the manufacturing information, and
- wherein the second area is located between the first area and the third area.

4. The cartridge according to claim 3, wherein
- the non-transitory memory further includes a write/erase area in which writing and erasing of data is permissible, and
- the manufacturing information, the electronic signature, and the first error-detecting code are stored in the write/erase area.

5. A printing system comprising:
- the cartridge according to claim 3; and
- a control device, the control device including:
  - a calculator configured to calculate a second error-detecting code from the manufacturing information of the non-transitory memory, and
  - a comparison determiner configured to compare the first error-detecting code of the non-transitory memory with the calculated second error-detecting code,
- wherein the comparison determiner is configured to, when the first error-detecting code matches the second error-detecting code, verify the electronic signature of the non-transitory memory.

6. The printing system according to claim 5, wherein the comparison determiner is configured to:
- in a first case where the first error-detecting code does not match the second error-detecting code, perform a first process related to the first case,
- in a second case where verification of the electronic signature is successful, perform a second process related to the second case, and in a third case where verification of the electronic signature fails, perform a third process related to the third case.

7. The printing system according to claim 6, further comprising:

a display unit, wherein the first process includes a first output process that causes the display unit to display first information related to the first case, the second process includes a second output process that causes the display unit to display second information related to the second case, the second information being different from the first information, and the third process includes a third output process that causes the display unit to display third information related to the third case, the third information being different from the first information and the second information.

* * * * *